US008078170B2

(12) United States Patent
Phan et al.

(10) Patent No.: US 8,078,170 B2
(45) Date of Patent: Dec. 13, 2011

(54) APPARATUS, METHOD AND COMPUTER PROGRAM PRODUCT PROVIDING FAST AND RELIABLE UPLINK SYNCHRONIZATION USING DEDICATED RESOURCES FOR USER EQUIPMENT IN NEED OF SYNCHRONIZATION (75) Inventors: Vinh Van Phan, Oulu (FI); Markku Vainikka, Kiviniemi (FI)

(73) Assignee: Nokia Corporation, Espoo (FI)

( * ) Notice: Subject to any disclaimer, the term of this patent is extended or adjusted under 35 U.S.C. 154(b) by 768 days.

(21) Appl. No.: 11/704,061

(22) Filed: Feb. 7, 2007

(65) Prior Publication Data

US 2007/0184865 A1 Aug. 9, 2007

Related U.S. Application Data (60) Provisional application No. 60/771,512, filed on Feb. 7, 2006.

(51) Int. Cl.
*H04W 36/00* (2009.01)

(52) U.S. Cl. ............... 455/436; 455/439; 455/442

(58) Field of Classification Search .......... 455/434, 455/436, 435.1, 437, 442, 414.1, 435.2, 435.3, 455/450, 451, 464, 502, 509; 370/329, 331, 370/330, 341, 348, 350
See application file for complete search history.

(56) References Cited

U.S. PATENT DOCUMENTS

| 6,108,547 | A   | *  | 8/2000  | Yamashita et al.     | 455/442 |
|-----------|-----|----|---------|----------------------|---------|
| 6,181,941 | B1  |    | 1/2001  | McCarthy             | 455/436 |
| 6,980,808 | B1  | *  | 12/2005 | Smith                | 455/450 |
| 7,596,379 | B2  | *  | 9/2009  | Farnsworth et al.    | 455/450 |
| 2003/0090999 | A1 |    | 5/2003 | Janczak              |         |
| 2004/0097254 | A1 |    | 5/2004 | Laroia et al.        |         |
| 2004/0176094 | A1 | *  | 9/2004 | Kim et al.           | 455/438 |
| 2005/0053029 | A1 |    | 3/2005 | Lee et al.           |         |
| 2005/0105487 | A1 | *  | 5/2005 | Rudolf et al.        | 370/329 |

(Continued)

FOREIGN PATENT DOCUMENTS

EP 1 594 336 A2 9/2005

(Continued)

OTHER PUBLICATIONS

3rd Generation Partnership Project; Technical Specification Group Radio Access Network; Requirements for Evolved UTRA (E-UTRA) and Evolved UTRAN (E-UTRAN) (Release 7), 3GPP TR 25.913, V7.2.0, Dec. 2005, 17pgs.

(Continued)

*Primary Examiner* — Jean Gelin
(74) *Attorney, Agent, or Firm* — Harrington & Smith (57) ABSTRACT

A method includes determining if a user equipment has a need to establish uplink synchronization with a base station. In response to determining that the user equipment has the need to establish uplink synchronization with the base station, a determination is made if uplink resources are available on a non-contention-based channel for the user equipment. In response to determining that uplink resources are available on the non-contention-based channel for the user equipment, the uplink resources are dedicated on the non-contention-based channel to the user equipment and an indication of the dedicated uplink resources is communicated to the user equipment. Using at least the uplink resources, the user equipment is synchronized on the non-contention-based channel in order to receive information from the user equipment.

27 Claims, 11 Drawing Sheets

U.S. PATENT DOCUMENTS

| | | | |
|---|---|---|---|
| 2005/0237932 A1* | 10/2005 | Liu .................................. | 370/230 |
| 2006/0140148 A1* | 6/2006 | Kwak et al. .................... | 370/329 |
| 2006/0223535 A1* | 10/2006 | Das et al. ....................... | 455/436 |
| 2007/0149227 A1* | 6/2007 | Parizhsky et al. ............. | 455/509 |
| 2007/0281702 A1* | 12/2007 | Lim et al. ...................... | 455/442 |
| 2010/0202402 A1 | 8/2010 | Dalsgaard et al. ............. | 370/331 |
| 2011/0149885 A1 | 6/2011 | Bachu et al. ................... | 370/329 |

FOREIGN PATENT DOCUMENTS

| | | |
|---|---|---|
| EP | 1 610 497 A1 | 12/2005 |
| JP | 2003304566 (A) | 10/2003 |
| WO | WO 2008/107856 A2 | 9/2008 |

OTHER PUBLICATIONS $3^{rd}$ Generation Partnership Project; Technical Specification Group Radio Access Network; Physical Layer Procedures (FDD) (Release 7), 3GPP TS 25.214, V7.1.0, Jun. 2006, 59 pgs.

$3^{rd}$ Generation Partnership Project; Technical Specification Group Radio Access Network; Physical Channels and Mapping of Transport Channels onto Physical Channels (FDD)(Release 7), 3GPP TS 25.211, V7.0.0, Mar. 2006, 50 pgs.

Part 16: Air Interface for Fixed Broadband Wireless Access Systems, IEEE Standard for Local and Metropolitan Area Networks, 802.16, Section 6.3.10, p. 199, and 8.3.7.1-2, p. 476-477, Oct. 2004.

Nokia, DL Resource Allocation Considerations, 3GPP TSG RAN WG1 Meeting #42bis, R1-051090, San Diego, CA, Oct. 10-14, 2005.

$3^{rd}$ Generation Partnership Project; Technical Specification Group Radio Access Network; Physical Layer Aspects for Evolved UTRA (Release 7) 3GPP TR 25.814, V0.5.0, Nov. 2005, 72 pgs.

$3^{rd}$ Generation Partnership Project; Technical Specification Group GSM/EDGE Radio Access Network; Radio subsystem synchronization (Release 6), 3GPP TS 45.010, V6.6.0, Nov. 2005, 25 pgs.

$3^{rd}$ Generation Partnership Project; Technical Specification Group Radio Access Network; Physical Layer procedures (Release 8), 3GPP TS 36.213, V1.2.0, Nov. 2005, 10 pgs.

* cited by examiner

| SIGNALING FIELD | SIZE | NOTES |
|---|---|---|
| HEADER FIELD | ONE BYTE? | ALLOWS FOR MORE FLEXIBILITY ON SIGNALING CHANNEL |
| DL SHARED CHANNEL ALLOCATION | <$N_{FD} \times N_{TD} \times RLID$<br><br>DIFFERENT ENCODING SCHEMES CAN BE CONSIDERED FOR REDUCING THE SIGNALING BITS | $N_{FD}$: NUMBER OF FREQUENCY RESOURCE ALLOCATION UNITS (CHUNKS) WITHIN DL BW<br><br>$N_{TD}$: NUMBER OF TEMPORAL RESOURCE ALLOCATION UNITS WITHIN DL SUBFRAME |
| TRANSPORT FORMAT INDICATOR | 5 BITS x N | |
| DL HARQ INFORMATION | 3 BITS | |
| UL SHARED CHANNEL ALLOCATION | <$N_{FU} \times N_{FCU} \times N_{TU}$ | $N_{FU}$: NUMBER OF FREQUENCY RESOURCE ALLOCATION UNITS (CHUNKS)<br><br>$N_{FCU}$: NUMBER OF LOCALIZED OR IFDMA COMPONENTS INSIDE UL CHUNK<br><br>$N_{TU}$: NUMBER OF TEMPORAL RESOURCE ALLOCATION UNITS WITHIN UL FRAME |
| HARQ FEEDBACK FOR UL | 1 BIT, x RLID | RADIO LINK ID MAY BE NEEDED, IF IT IS NOT PRESENT OTHERWISE |

FIG.4A

| | | |
|---|---|---|
| TIMING ADVANCE FOR UL | | NOT ALWAYS PRESENT. DEPENDS ON CHANGES IN PATH DELAYS |
| POWER CONTROL LEVEL INDICATOR | | NOT ALWAYS PRESENT. DEPENDS ON CHANGES IN THE PROPAGATION ENVIRONMENT |
| PICH | 5-6 BITS | PAGING INDICATOR. DESCRIBES, WHETHER PAGING MESSAGE ARE PRESENT IN A RESOURCE ALLOCATION UNIT OF A SHARED CHANNEL IN THIS SUB-FRAME |
| [RESERVED FOR FUTURE USE] | | |

APPARATUS, METHOD AND COMPUTER PROGRAM PRODUCT PROVIDING FAST AND RELIABLE UPLINK SYNCHRONIZATION USING DEDICATED RESOURCES FOR USER EQUIPMENT IN NEED OF SYNCHRONIZATION

CROSS-REFERENCE TO RELATED APPLICATIONS

The present application claims the benefit under 35 U.S.C. §119(e) of U.S. Provisional Patent Application No. 60/771,512, filed on 7 Feb. 2006, the disclosure of which is hereby incorporated by reference in its entirety.

TECHNICAL FIELD

The exemplary and non-limiting embodiments of this invention relate generally to wireless communications systems, methods and devices and, more specifically, relate to techniques for uplink synchronization of a user equipment, such as a cellular phone, in a wireless network.

BACKGROUND

The following abbreviations are herewith defined:
3GPP third generation partnership project
AMC adaptive modulation and coding
AT allocation table
BS base station
DCH dedicated transport channel
DL downlink (Node B to UE)
eNode B evolved Node B
H-ARQ hybrid automatic repeat request
HSUPA high speed uplink packet access
L1 layer 1 (physical (PHY) Layer)
LTE long term evolution
Node B base station
OFDMA orthogonal frequency division multiple access
RACH random access channel
RF radio frequency
RRC radio resource control
SC-FDMA single carrier-frequency division multiple access
SCH shared transport channel
TTI transmission time interval
UE user equipment
UL uplink (UE to Node B)
UMTS universal mobile telecommunications system
UTRA universal terrestrial radio access
UTRAN universal terrestrial radio access network
E-UTRAN evolved UTRAN
QoS quality of service The following references contain information of use in understanding exemplary embodiments of the disclosed invention: third generation partnership project (3GPP) technical report (TR) 25.913, V7.2.0 (2005-12), Requirements for Evolved UTRA (E-UTRA) and Evolved UTRAN (E-UTRAN); 3GPP TR 25.814, V0.5.0 (2005-11), Physical Layer Aspects for Evolved UTRA; and 3GPP TSG RAN WG1 Meeting #42bis, San Diego, USA, 10-14 Oct., 2005, "DL resource allocation considerations" (R1-051090).

Of particular interest to the exemplary embodiments of this invention are modern cellular networks, such as one referred to as UTRA LTE in 3GPP UMTS. Modern cellular networks may employ multi-carrier technologies such as OFDMA in the DL and SC FDMA in the UL, and various advanced radio transmission techniques such as AMC and H-ARQ. The radio interface relies on the presence of a SCH in both the UL and DL with fast adaptive resource allocation for simple and efficient radio resource utilization and QoS support, and no longer uses a DCH. Details of this particular type of system may be found in 3GPP TR 25.913 and 3GPP TR 25.814.

In such a system, in order for an active UE and a serving BS to transmit and receive user data in both the UL and DL, the UE and the BS must be in synchronization with each other, and the UE must be informed of dedicated resources, including allowed transport formats, for its next TTI prior to the start of the TTI.

In the DL, the UE is able to acquire the synchronization whenever needed by "listening" to DL pilot and broadcast channels. In the UL, however, the situation is more complex, and the UE may need to adjust its transmission timing based on timing advance information feedback from the BS. An initial UL synchronization between the UE and the BS often requires using a RACH. As is known, the RACH is a logical channel and is a contention-based access channel that is used by UEs to transmit control messages and requests. However, the use of a contention-based channel implies that collisions with other UEs can occur, resulting in some finite and variable access delay. This initial UL synchronization procedure may also be referred to in the literature as a ranging process.

Figures 2, 2B:
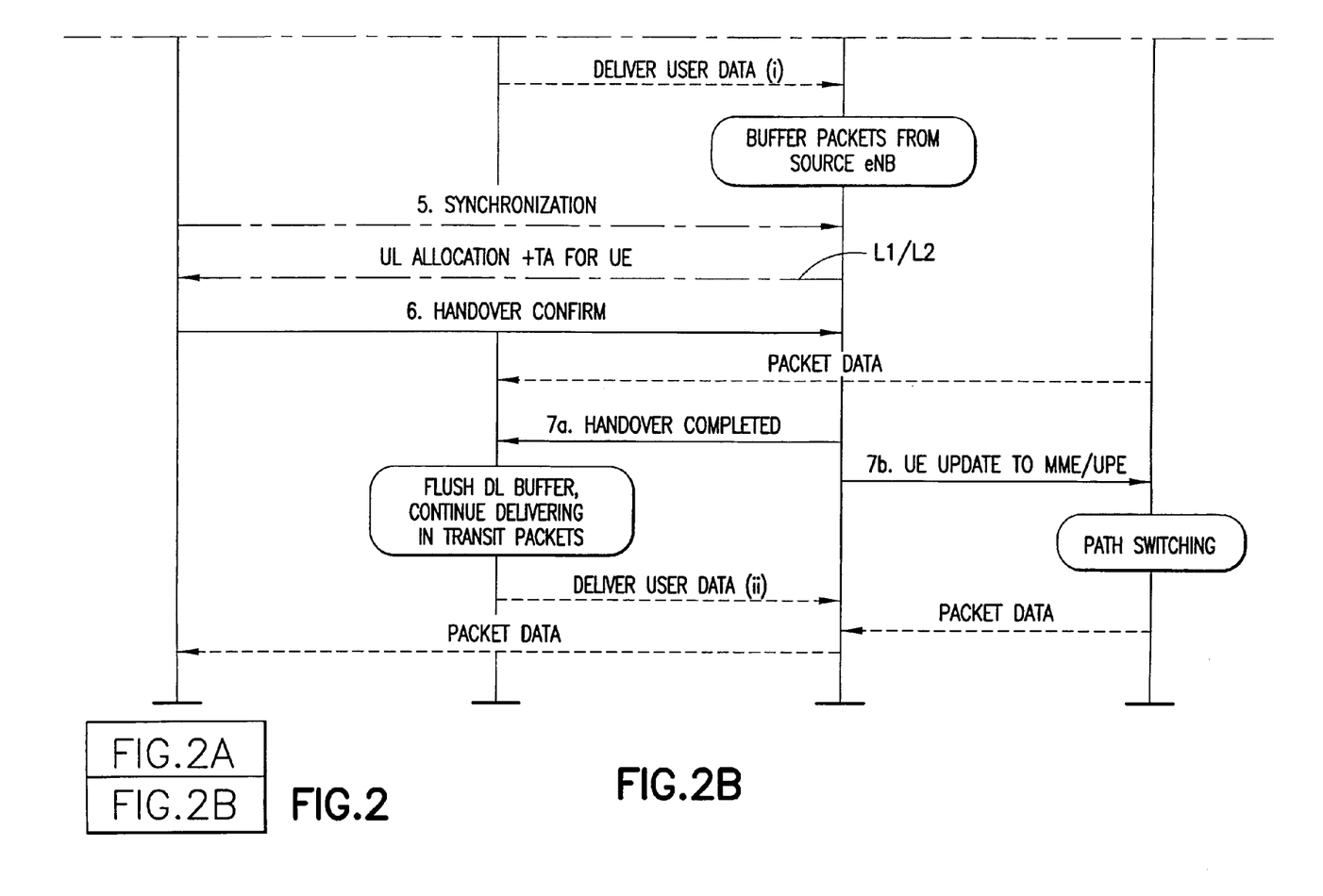
FIG. 2 depicts a signaling exchange for an exemplary handover control example.
Figure 2A:
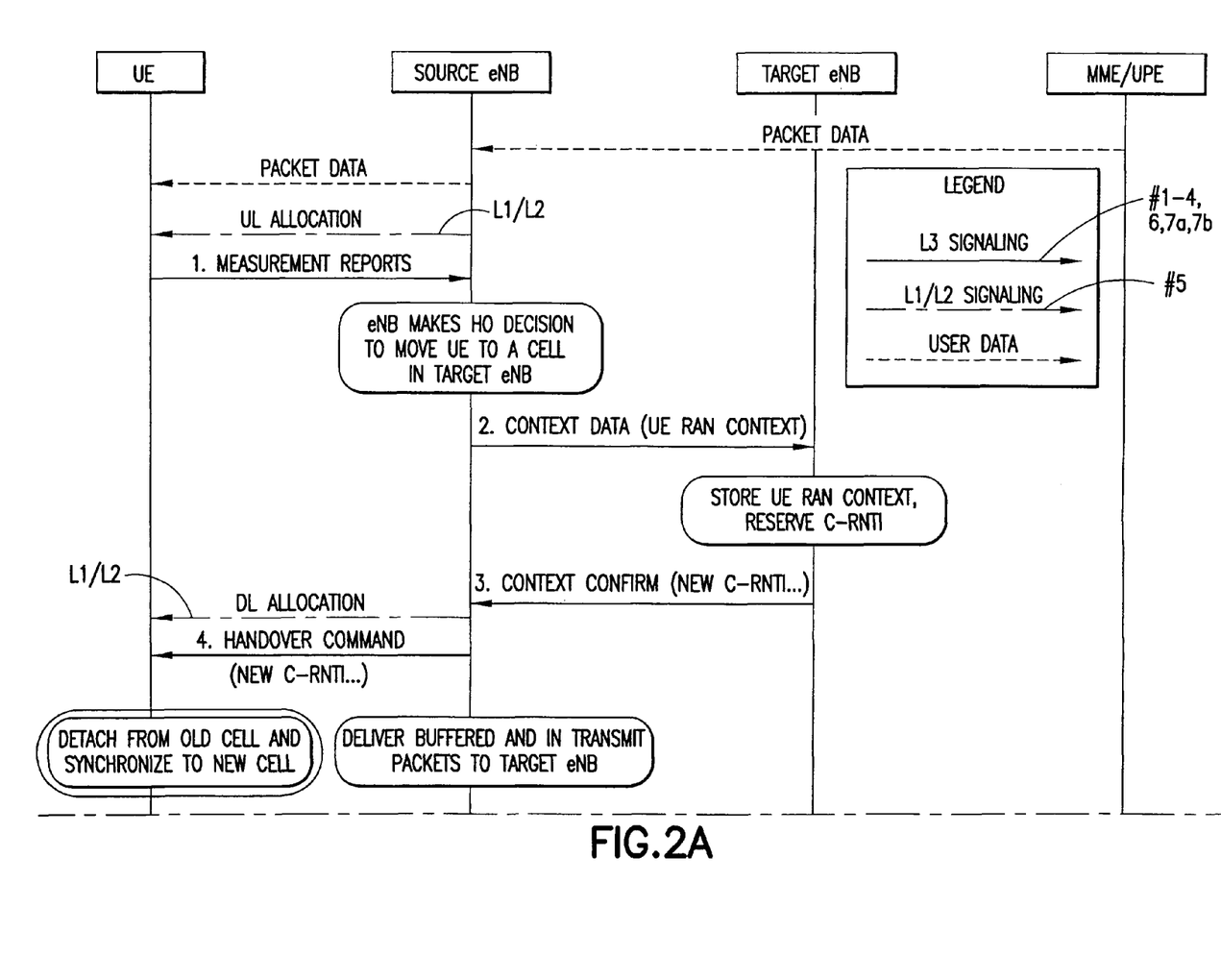

Consider now a situation in which the UE has an urgent need to (re)establish the UL synchronization with the BS in order to communicate for further transactions known and, perhaps, controlled by the network. As an example, the UE may be in a handover process between two base stations, i.e., between a source BS (current cell) and a target BS (next cell), as illustrated in FIG. 2. The circled UE transaction in FIG. 2, labeled "Detach from old cell, and synchronize to new cell" indicates a relevant situation in which the UE must quickly establish the UL synchronization with the target BS (shown as "Target eNB", also known as a target eNode B, in FIG. 2). As another example, consider a case in which the BS needs to page the UE, which is in an idle state, for an incoming call. Depending on UE mobility and network deployment scenarios, the network knows the exact UE location on a cell basis (for example, in a fixed wireless and/or single cell system). In this case the UE, after receiving the paging message, has an urgent need to establish the radio connection with the BS and, in order to accomplish this task, is required to first perform UL synchronization. As yet another example, consider a case where the UE is in an active state and for some reason related to radio channel conditions loses synchronization with the BS in the UL. The UE must then re-establish the UL synchronization as soon as possible.

As can be appreciated, the various exemplary cases considered above have in common an urgent need for the UE to perform a fast and reliable connection and/or (re)establishment of UL synchronization with the BS, and the network is aware of and able to control the UE in the DL.

In current cellular systems, the UE in the aforementioned situations needs to perform the ranging procedure using the RACH toward the target BS to acquire advance timing information and synchronization in the UL. However, and as was noted above, the RACH is a contention channel and therefore collisions with other UEs can occur, resulting in a user-perceivable and undesirable access delay.

It should be noted that E UTRAN has a much more stringent latency requirement than UTRAN, yet more flexibility in terms of SCH resource allocation and utilization for both the UL and the DL on a L1 sub frame basis. This is accomplished through the use of the AT that is broadcast in the DL at the beginning of each L1 sub frame for all active UEs. The principles and general requirements of resource allocation and related signaling for LTE of UTRA (E UTRA) are provided, for example, in 3GPP TR 25.814 and in R1 051090.

BRIEF SUMMARY

In an exemplary embodiment, a method is disclosed that includes determining if a user equipment has a need to establish uplink synchronization with a base station. The method includes, in response to determining that the user equipment has the need to establish uplink synchronization with the base station, determining if uplink resources are available on a non-contention-based channel for the user equipment. In response to determining that uplink resources are available on the non-contention-based channel for the user equipment, the method includes dedicating the uplink resources on the non-contention-based channel to the user equipment and communicating an indication of the dedicated uplink resources to the user equipment. The method further includes, using at least the uplink resources, synchronizing with the user equipment on the non-contention-based channel in order to receive information from the user equipment.

In another exemplary embodiment, a computer program product is disclosed that tangibly embodies a program of machine-readable instructions executable by at least one data processor to perform operations. The operations include determining if a user equipment has a need to establish uplink synchronization with a base station, and, in response to determining that the user equipment has the need to establish uplink synchronization with the base station, determining if uplink resources are available on a non-contention-based channel for the user equipment. The operations include, in response to determining that uplink resources are available on the non-contention-based channel for the user equipment, dedicating the uplink resources on the non-contention-based channel to the user equipment and communicating an indication of the dedicated uplink resources to the user equipment. The operations also include, using at least the uplink resources, synchronizing with the user equipment on the non-contention-based channel in order to receive information from the user equipment.

In another exemplary embodiment, an apparatus includes a transceiver; and at least one data processor coupled to the transceiver. The at least one data processor is configured to determine if a user equipment has a need to establish uplink synchronization with a base station. The at least one data processor is further configured, in response to a determination that the user equipment has the need to establish uplink synchronization with the base station, to determine if uplink resources are available on a non-contention-based channel for the user equipment. The at least one data processor is also configured, in response to a determination that uplink resources are available on the non-contention-based channel for the user equipment, to dedicate the uplink resources on the non-contention-based channel to the user equipment and to use the transceiver to communicate an indication of the dedicated uplink resources to the user equipment. The at least one processor is further configured, using at least the uplink resources and the transceiver, to synchronize on the non-contention-based channel at least the transceiver with the user equipment in order to receive information from the user equipment.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 3, including

DETAILED DESCRIPTION OF EXEMPLARY EMBODIMENTS

Figure 1:
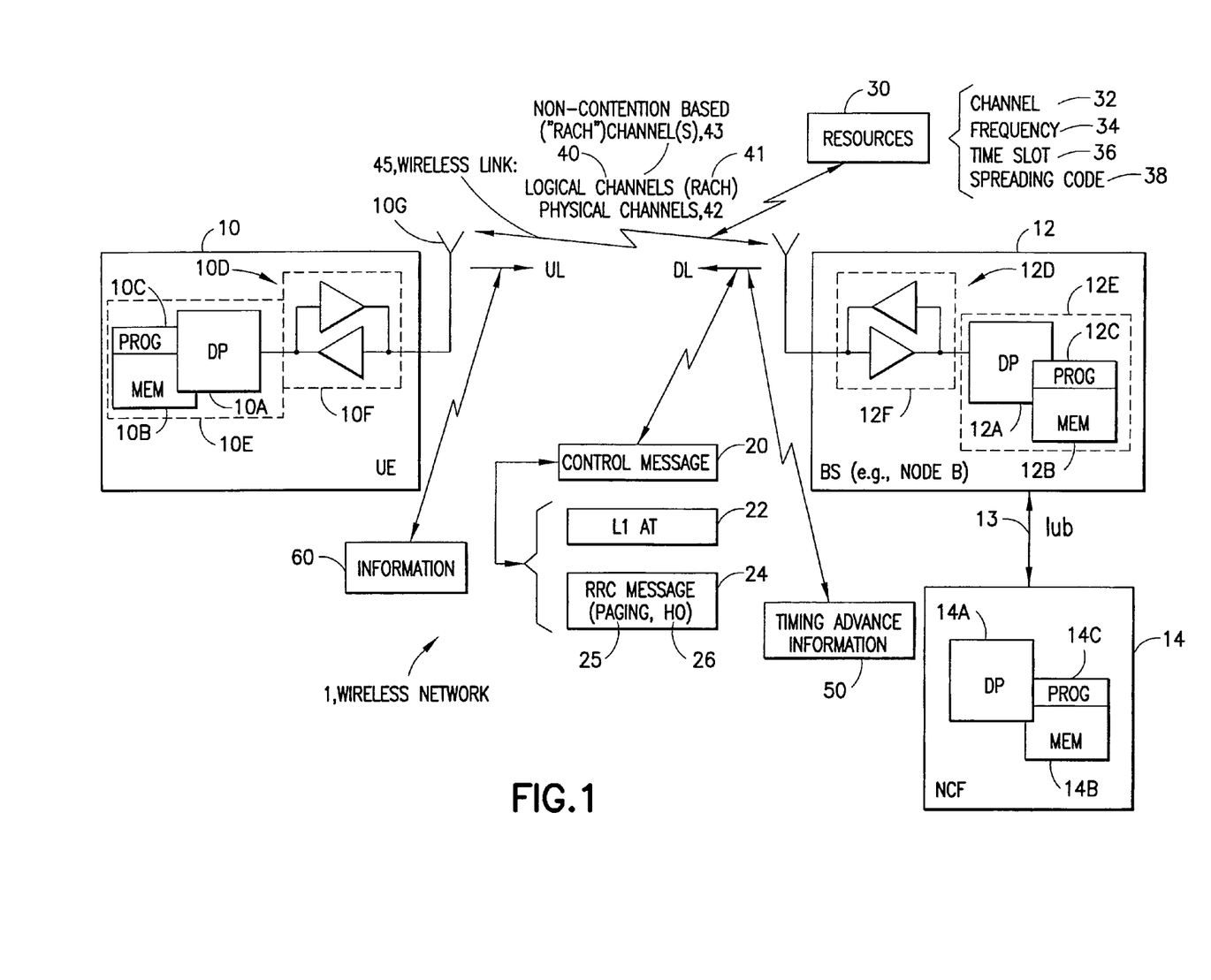
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1, a wireless network 1 is adapted for communication with a UE 10 via a Base Station (BS) 12, which is this example is a Node B or an eNode B. The network 1 may include at least one network control function (NCF) 14. The UE 10 includes a data processor (DP) 10A, a memory (MEM) 10B that stores a program (PROG) 10C, and a suitable radio frequency (RF) transceiver 10D for bidirectional wireless communications using at least one antenna 10G with the BS 12, which also includes a DP 12A, a MEM 122B that stores a PROG 12C, and a suitable RF transceiver 12D coupled to at least one antenna 12G. The BS 12 is coupled via a data path 13 to the NCF 14 that also includes a DP 14A and a MEM 14B storing an associated PROG 14C. At least the PROGs 10C and 12C are assumed to include program instructions that, when executed by the associated DP, enable the electronic device to operate in accordance with the exemplary embodiments of the invention. The embodiments of this invention may be implemented by computer software executable by the DP 10A of the UE 10 and the DP 12A of the BS 12, or by hardware, or by a combination of software and hardware. Additionally, the hardware may include integrated circuits 10E, 10F, 12F, and 12E. The integrated circuits 10E, 10F, 12F, and 12E are merely exemplary, and each integrated circuit may contain more or fewer components than shown. For instance, a transceiver 10D, 12D may include multiple integrated circuits for, e.g., baseband processing and intermediate frequency processing.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi core processor architecture, as non limiting examples. It is noted that exemplary embodiments of the disclosed invention may be implemented in a computer program product (e.g., as part of MEM 10B or 12B or both) that tangibly embodies a program of machine-readable instructions executable by a digital processing apparatus, such as UE 10 or BS 12 (and their associated DB 10A or 12A), to perform operations described herein.

In FIG. 1, the wireless link 45 can be considered to include a number of logical channels 40 (e.g., RACH 41) that get mapped onto physical channels 42. The physical channels 42 are defined at least in part by, e.g., a (e.g., UL carrier) frequency 34, access code 38 (e.g., spreading code 38), and/or time slot 36. Physical channels 42 (and the logical channels 40) may be on the uplink (UL), from the UE 10 to the BS 12, or on the downlink (DL), from the BS 12 to the UE 10. The UE 10 transmits information 60 on the UL to the BS 12. In certain situations (as described in more detail below), the timing advance information 50 is communicated on the DL from the BS 12 to the UE 10 to help synchronization on the UL. The frequency 34, time slot 36, and spreading code 38 form resources 30 that can be assigned on the UL to a UE 10. In an exemplary embodiment, a UE 10 is assigned resources 30 for a non-contention-based channel 43. This channel 43 is non-contention-based because the channel 43 is assigned solely to the UE 10 and other UEs (not shown) are not allowed access to the channel 43 while the channel 43 is assigned to UE 10. The dedicated resources 30 for the channel 43 may resemble (e.g., in terms of for instance the transport format and the reception at the BS 12) an UL RACH transmission, except the dedicated resources 30 (e.g., and the corresponding channel 43) are scheduled solely for the UE 10, rather than contention-based. Thus, in FIG. 1, the channel 43 is shown as a non-contention-based ("RACH") channel, although a channel 43 that has some resemblance to a contention-based RACH is only one example of a non-contention-based channel 43. It is noted that there may be multiple non-contention-based channels 43, as in one exemplary embodiment herein, a first non-contention-based channel 43 is used to provide UL synchronization, then a second non-contention-based channel 43 is assigned to the UE 10 for further transactions on the UL between the UE 10 and the BS 12.

It is helpful at this time to clarify the generic logical concept of channels used for the user communication in wireless networks. The term "channel" can be referred to as a frequency band, a time slot, a code sequence, even a direction beam or a signature modulation waveform used for radio transmission of a particular user. In general, a channel can be comprised of any resource in time, frequency, code or space domains, or combination thereof used to send and receive user information. A channel, however, happens in time. Thus, a collection of time frames, different phases in a time frame, or slots, as basic time-division elements, defines channels, which are most commonly found in modern communications systems. In this case, channels are said to be of a slotted system and transmission attempts on a channel can take place only at discrete instants in time. A slotted system requires network-wide synchronization, which is easier to achieve in centralized networks by using time reference of the base station. The synchronization is more difficult in distributed networks. In a slotted system, a slot is the basic time unit. A slot is usually large enough to carry the smallest information packet. In an advanced wireless network, channels are often characterized and classified as, e.g., the following: logical or physical; control or traffic; UL or DL; common, dedicated or shared depending on provided functions and access methods; and so forth. Each class is often assigned to a particular type of traffic. Data packets carried on different channels can come with different formats and sizes, fixed or variable. Consequently, the resources 30 of channel 32, frequency 34, time slot 36, and spreading code 38 are merely exemplary.

Figures 4, 4B:
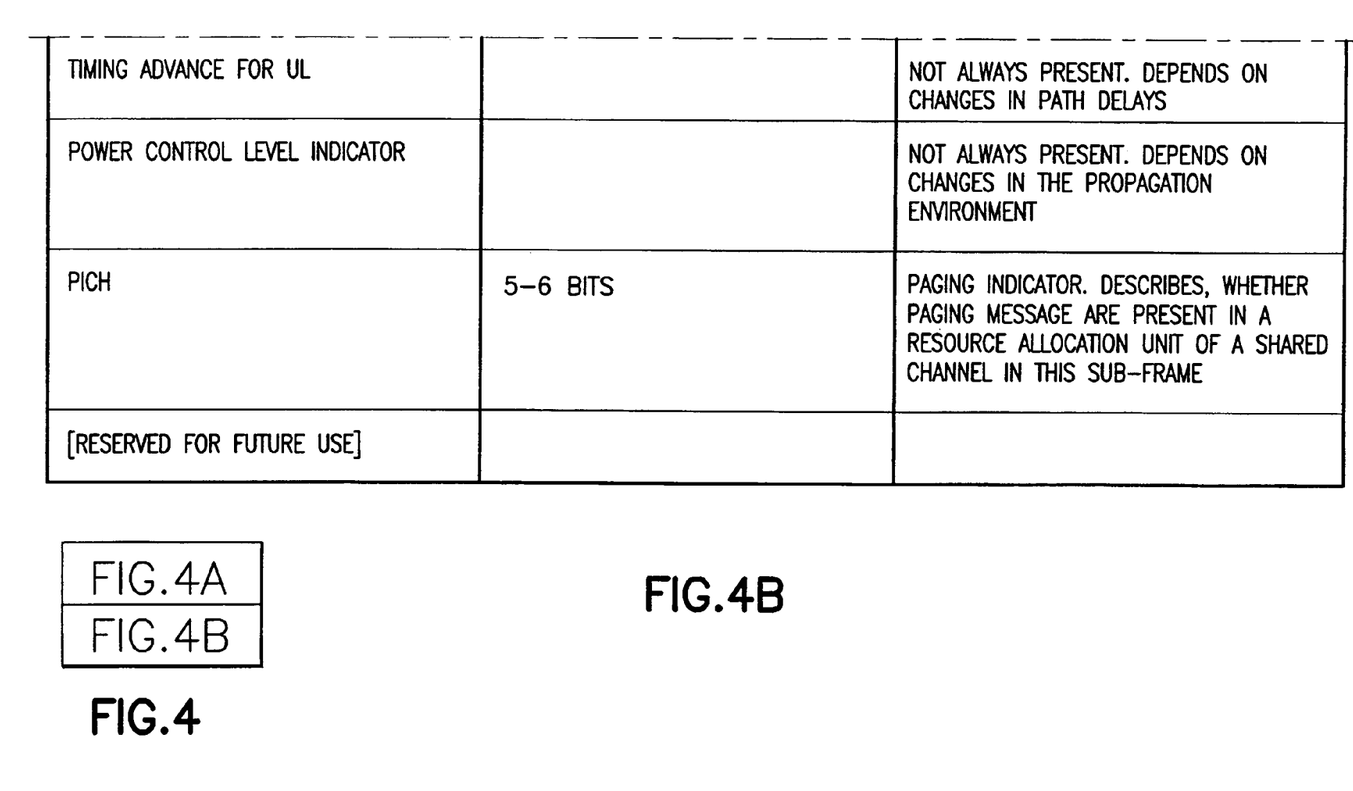
FIG. 4 depicts an exemplary control message, in this case an exemplary L1 allocation table.
Figure 4A:
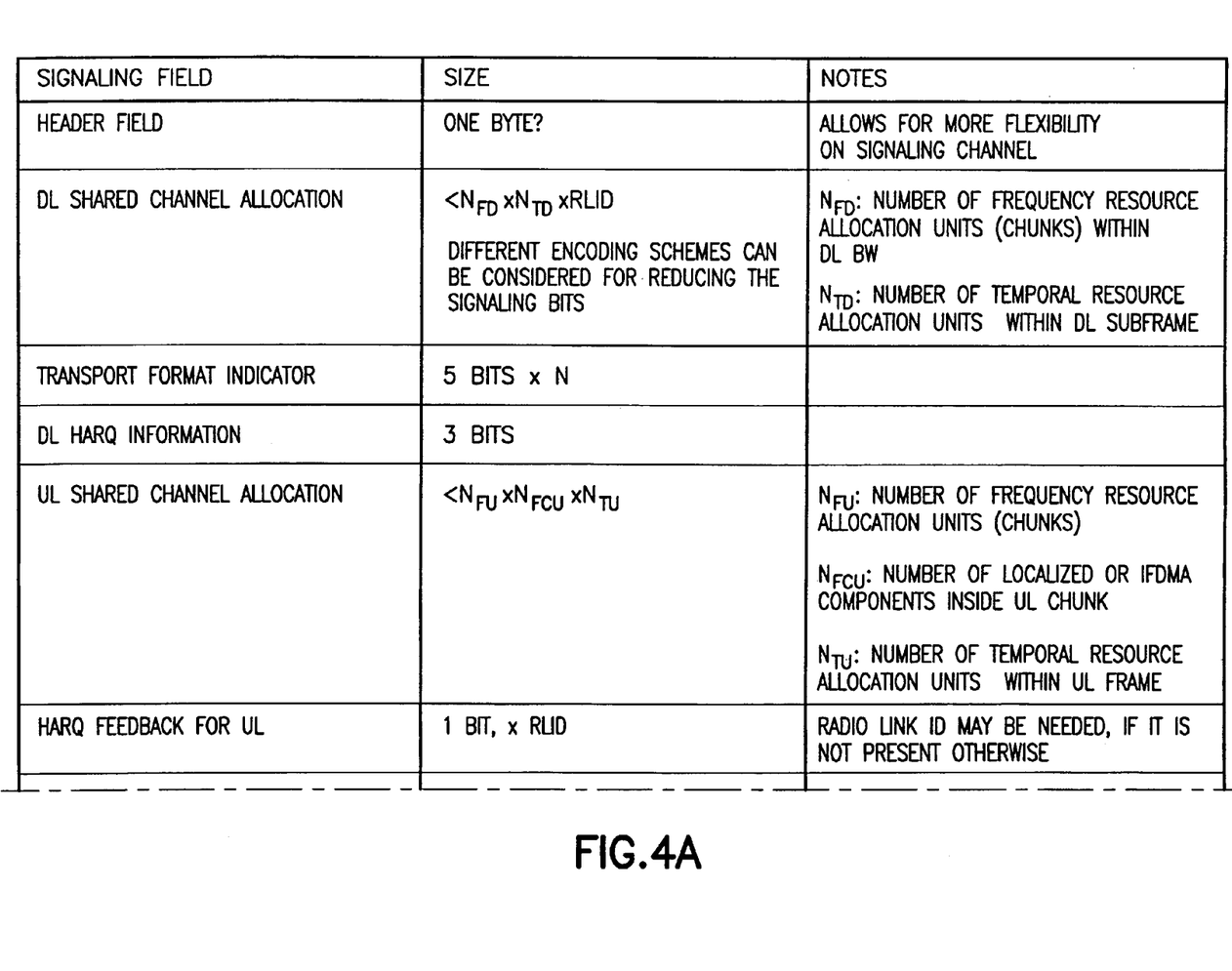

In order to inform the UE 10 of which resources 30 have been dedicated (e.g., allocated) to the UE 10, a control message 20 is shown that is transmitted from the BS 12 to the UE 10. The control message 20 can include any message suitable for informing the UE 10 as to which resources 30 are dedicated to the UE 10. Two exemplary messages are the L1 AT 22 and the RRC message 24 (e.g., paging 25 or handover 26). An example of an L1 AT 22 message is shown in FIG. 4.

Exemplary embodiments of this invention provide simple techniques for the UE 10 to acquire fast and reliable UL synchronization in order to minimize the access latency and ensure continuity for UE 10 connection(s) to enhance QoS, such as when operating in the E-UTRAN system.

Figure 3A:
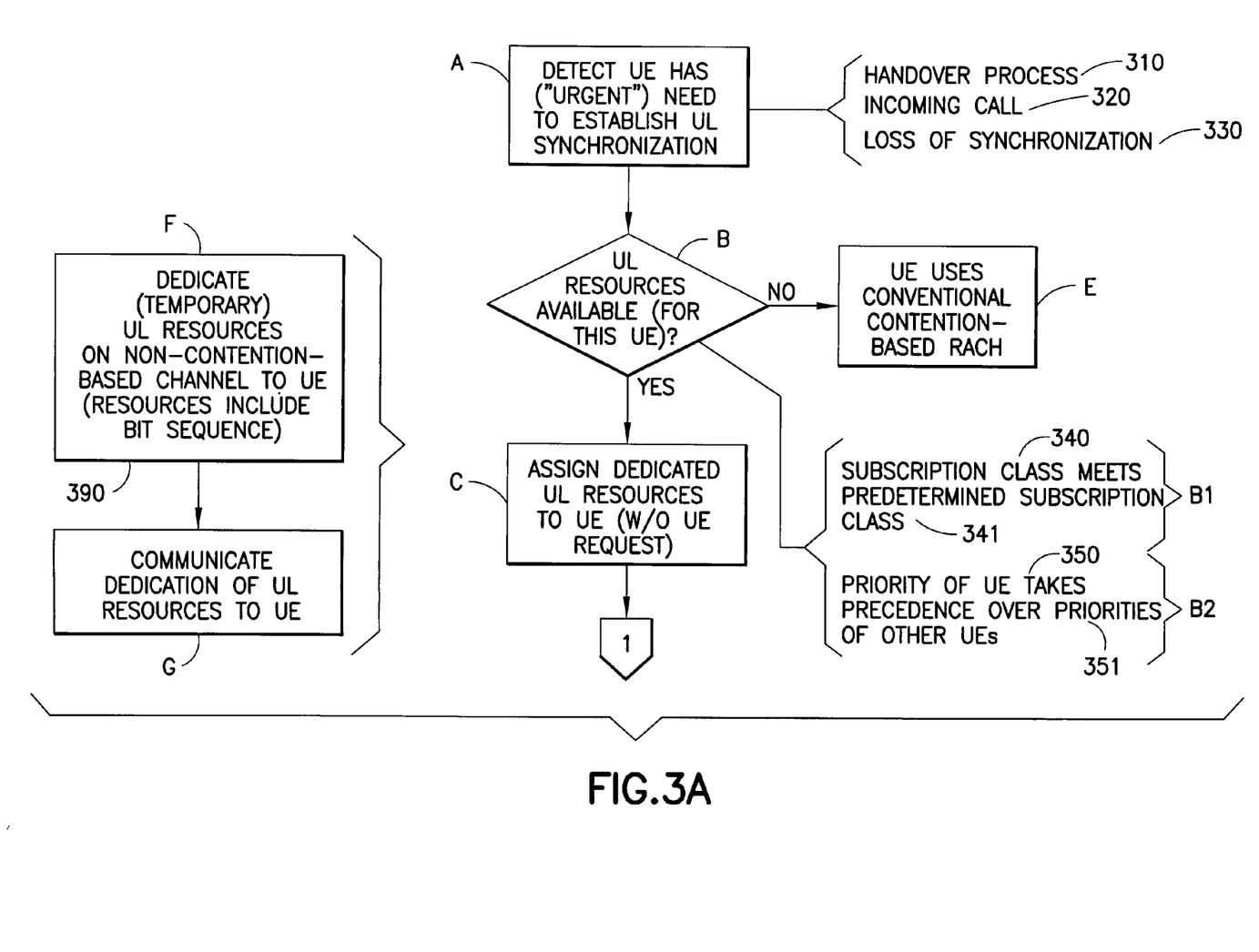
FIGS. 3A and 3B, illustrates a logic flow diagram that is descriptive of a method and an operation of one or more BSs (and UE) computer programs for implementing the exemplary embodiments of this invention.
Figure 3B:
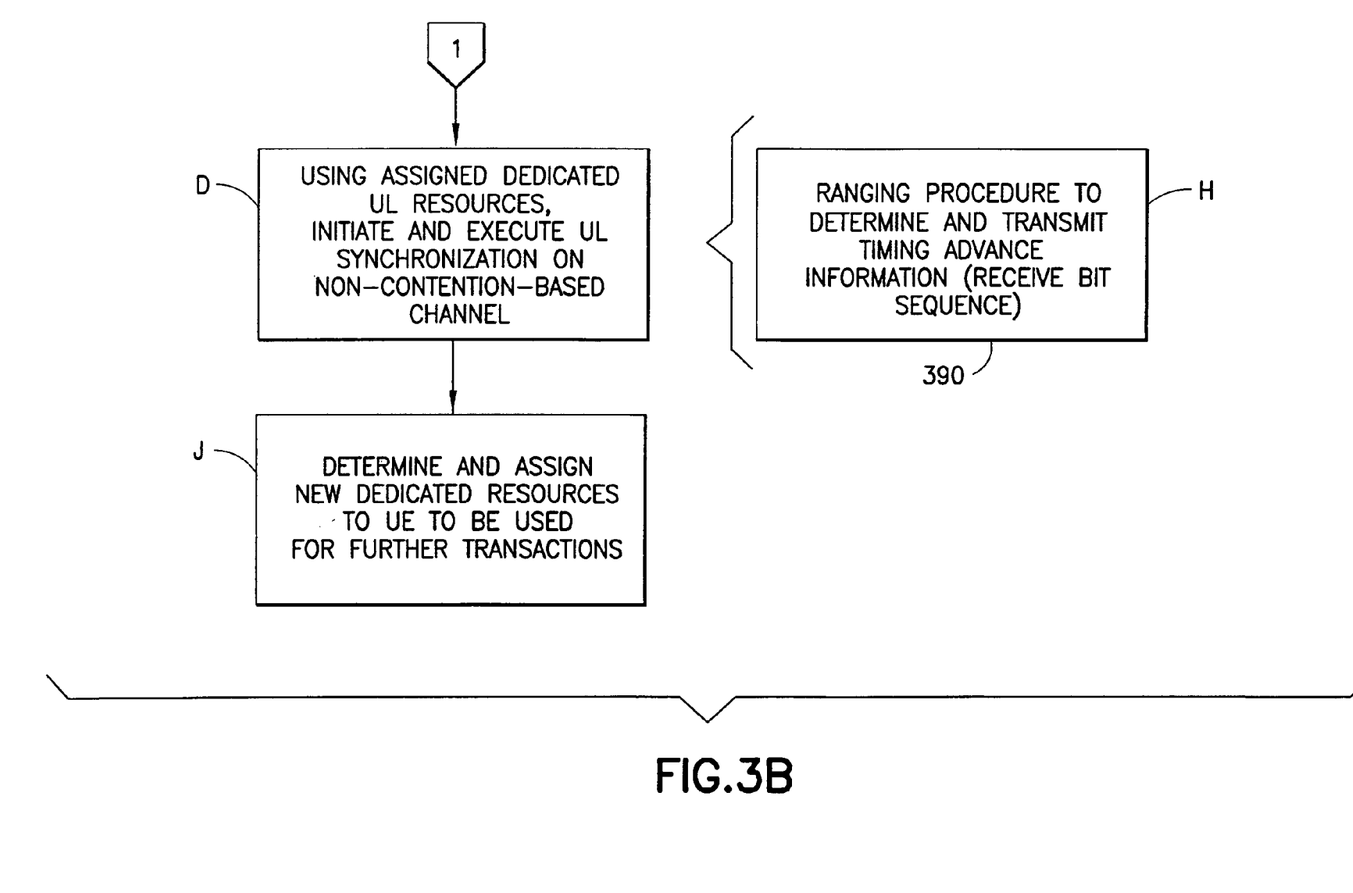

In accordance with exemplary embodiments of this invention, and referring to FIG. 3 (including FIGS. 3A and 3B), at Action A the network side, including the (e.g., target) BS 12, recognizes the UE 10 as having a need (e.g., a need that is deemed "urgent") for establishing an UL synchronization and subsequent radio connection. The BS 12 can be, for example, the target BS 12 in a handover process 310, or the last BS which last served a currently paged UE 10, or a current BS 12 in a case where the UE 10 has temporarily lost synchronization 330 due to, for example, uncertainty of the radio channel. The urgent need in the handover process 310 could be determined in response to the BS 12 receiving Action 2 in FIG. 2 when the Source BS decided to hand the UE over to the Target BS. Additionally, the urgent need could be an incoming call 320 to the UE 10 (e.g., "from" the BS 12). For instance, the BS 12 could receive a paging message from Core Network side (e.g., NCF 14) in paging cases where the cell location of the paged UE known. In these cases, there is no need (from the point of view of the UE) for the UE to send an explicit request for UL resources. These examples of need for UL synchronization are merely exemplary and any situation where the UE 10 needs to (re)establish UL synchronization with the BS 12 could be considered to be a need for UL synchronization. It is also noted that there may be situations where the need might not deemed to be "urgent" but where the techniques of the disclosed invention herein may be used.

At Action B, the BS 12 determines if it has available resources to dedicate (e.g., temporarily) on the non-contention-based channel 43 to the UE 10. If the BS 12 does, the method proceeds to Action C, otherwise the BS 12 proceeds to Action E where the UE 10 may instead use the conventional contention-based RACH to acquire the timing advance information and synchronization in UL. Typically, there is no communication from the BS 12 to the UE 10 in Action E. There is generally no need to inform the UE in this particular Action E for correct operation. In FIG. 2, for instance, if there is no information of an assigned dedicated resource sent in a Handover (HO) Command, Action 8 in FIG. 2, for the UE, as the UE will use the RACH of the target cell (i.e., Target eNB in FIG. 2), of which the configuration is known by the UE via broadcast system information of the target cell. However, some advanced control information on how the particular UE can use the RACH can be sent in, e.g., the HO Command as well (in Action 8 of FIG. 2 and action E of FIG. 3).

The decision mechanism behind Action B can further incorporate various smart quality-of-service differentiation paradigms, in which pre-prioritized user profile characteristics play an important role. For instance, in Action B, the system (e.g., BS 12) can decide which UE should follow either Action C or Action E based upon, e.g., the priority 350 of UE or the subscription class 340 of UE. Thus, a highly-important UE 10 could be a UE where the subscription class 340 of the UE 10 meets a predetermined subscription class 341 (Action B1) or where a priority 350 of the UE takes precedence over the priorities 351 of other UEs (Action B2). The precedence could be determined, e.g., by the priority 350 being greater than priorities 351 or the priority 350 being less than the priorities 351, depending on how priorities are valued, or through any other technique. The highly-important UE may be able to use dedicated resources to get access to a targeted cell (e.g., during a handover process 310) whereas a less-important UE would likely use contention-based RACH. Further, advanced control information embedded in, e.g., and RRC message 24 such as HO Command (e.g., HO 26 in FIG. 1) or Paging 25 or L1 AT 22 can tell the UE how to access the cell on the given channel according to the access class of the UE. For example, an important UE (e.g., as judged by subscription class 340 or priority 350) can attempt to access the channel right away, whereas a less important UE may have to make an access attempt with a certain probability less than one and/or wait a certain period of time after each unsuccessful attempt to resolve contention.

At Action C, the target BS 12 assigns dedicated resources 30 for the UE 10, which is in urgent need for achieving fast and reliable UL (re)synchronization and connection (re)establishment. The dedicated resources 30 are an indication of the non-contention-based channel 43, which is a channel designed in an exemplary embodiment to be similar to the RACH, but without being contention-based. In another exemplary embodiment, the non-contention-based channel 43 is any possible channel that can be assigned to a UE 10 for non-contention-based communication with the BS 12.

It is noted that this action takes place without a UE request to allocate resources. Action C may be executed, for example, via Action F, where the BS 12 dedicates UL resources 30 to the UE 10, and via a communication in Action G. Such a communication can be, for instance, an L1 AT 22 broadcast in the DL in the cases of, for example, handover process 310 or a temporary loss of synchronization 330. Action G may also be executed, as a further non-limiting example, via the L1 AT 22 or a RRC Paging Message 25 broadcast in the DL by the last (e.g., current) BS 12, in the case of a page for a UE 10 having a known cell location. It is noted that in Action F, the dedication of the resources 30 may include a bit sequence 390, which is to be communicated from the UE 10 to the BS 12 during the ranging procedure.

At Action D, the UE 10, upon receiving the dedicated resource information, uses the dedicated resources to perform the ranging procedure (Action H) in order to acquire the timing advance information and synchronization in UL. The timing advance value here corresponds to the length of time a signal from the UE takes to reach the BS. The timing advance value is determined by the BS. Once the UE knows the dedicated resources 30, the UE uses the resources to perform ranging to get accurate timing-advance information 50 (e.g., an indicated of the timing advance value) so as to synchronize properly with the BS 12. Then, the UE 10 can transmit and the BS 12 can receive correctly at the right time. Thus, having UE know the dedicated resources is generally not enough for proper synchronization.

The ranging procedure is adopted in IEEE 802.16 but not in 3GPP. In 3GPP, the ranging procedure is often considered as a part of the L1 Random Access Procedure. Aspects concerning timing advance information are, however, described in, e.g., 3GPP TS 45.010 V6.6.0 (2005-11). For instance, section 1.2 of TS 45.010 states that timing advance is a "signal sent by the BTS to the MS which the MS uses to advance its timings of transmissions to the BTS so as to compensate for propagation delay", where "BTS" is a base transceiver station (e.g., one type of BS 12) and "MS" is a mobile station, called a UE herein. Section 2 of TS 45.010 also states the following: "The MS times its transmissions to the BTS in line with those received from the BTS. The BTS sends to each MS a 'timing advance' parameter (TA) according to the perceived round trip propagation delay BTS-MS-BTS. The MS advances its timing by this amount, with the result that signals from different MS's arriving at the BTS and compensated for propagation delay. This process is called 'adaptive frame alignment'." The timing advance parameter is one example of timing advance information 50, which can include any information to allow the UE 10 to synchronize in time with the BS 12.

The term "ranging" is used here because this is a more generic term (as compared to the L1 Random Access Procedure such as the adaptive frame alignment) and goes well with RACH, dedicated resources 30, or the like. As described above, the UE 10 needs to get accurate enough timing-advance information to synchronize with the BS in UL, and the ranging is used for this. In Action D, the BS 12 also uses the dedicated resources 30 to synchronize with the UE 10. Action H, which is considered a part of Action D, entails using a ranging procedure to determine and transmit timing advance information 50. The BS 12 and MS 10 act together during the ranging procedure to synchronize using the timing advance information 50. It is also noted that Action D (and Action H) should result in synchronization of the UE 10 with the BS 12, so that UL information 60 (such as voice or other data) can be transferred from the UE 10 to the BS 12. It is noted that synchronization involves at least synchronizing the RF transceivers 10D and 12D. In an embodiment where the bit sequence 390 was transferred from the BS 12 to the UE 10 in Action F, in Action H, the UE 10 then transfers the bit sequence 390 back to the BS 12 in Action H. Normally, the bit sequence, also referred to as a preamble, is designed specifically for ranging purposes. The BS 12 may not have to receive all of the sequence, bit-by-bit correctly, in order to derive the timing advance information 50. The BS 12 may try to match the sequence and based on an auto-correlation value, the BS 12 will determine the right value for the timing advance value (e.g., as indicated in the timing advance information 50).

A dedicated resource 30 may include any network resource needed by the UE 10 to establish contact with the BS 12 for the purposes of achieving fast and reliable UL (re)synchronization and connection (re)establishment. Non-limiting examples include one or more of an UL channel 32 (e.g., a channel number), an UL frequency 34, an UL time slot 36 and/or a spreading code 38.

When the dedicated resources are temporarily dedicated to the UE 10 (e.g., in Action F), Action J is performed. In Action J, new dedicated resources 30 are determined for the UE 10 and assigned to the UE 10. Additional transactions between a UE 10 and the BS 12 will then occur using the new dedicated resources 30. The new dedicated resources would correspond to a non-contention-based channel 43, such as a shared transport channel (SCH) or a dedicated transport channel (DCH), depending on the radio system of interest.

It is noted that if the non-contention based channel 43 resembles the conventional RACH in terms of transport format, this format is already known by the UE 10 via system broadcast information concerning conventional RACH. Thus, while any non-contention-based channel 43 might be used, in an exemplary embodiment, the non-contention-based channel 43 resembles the contention-based RACH at least in terms of transport format.

Figures 5, 5B:
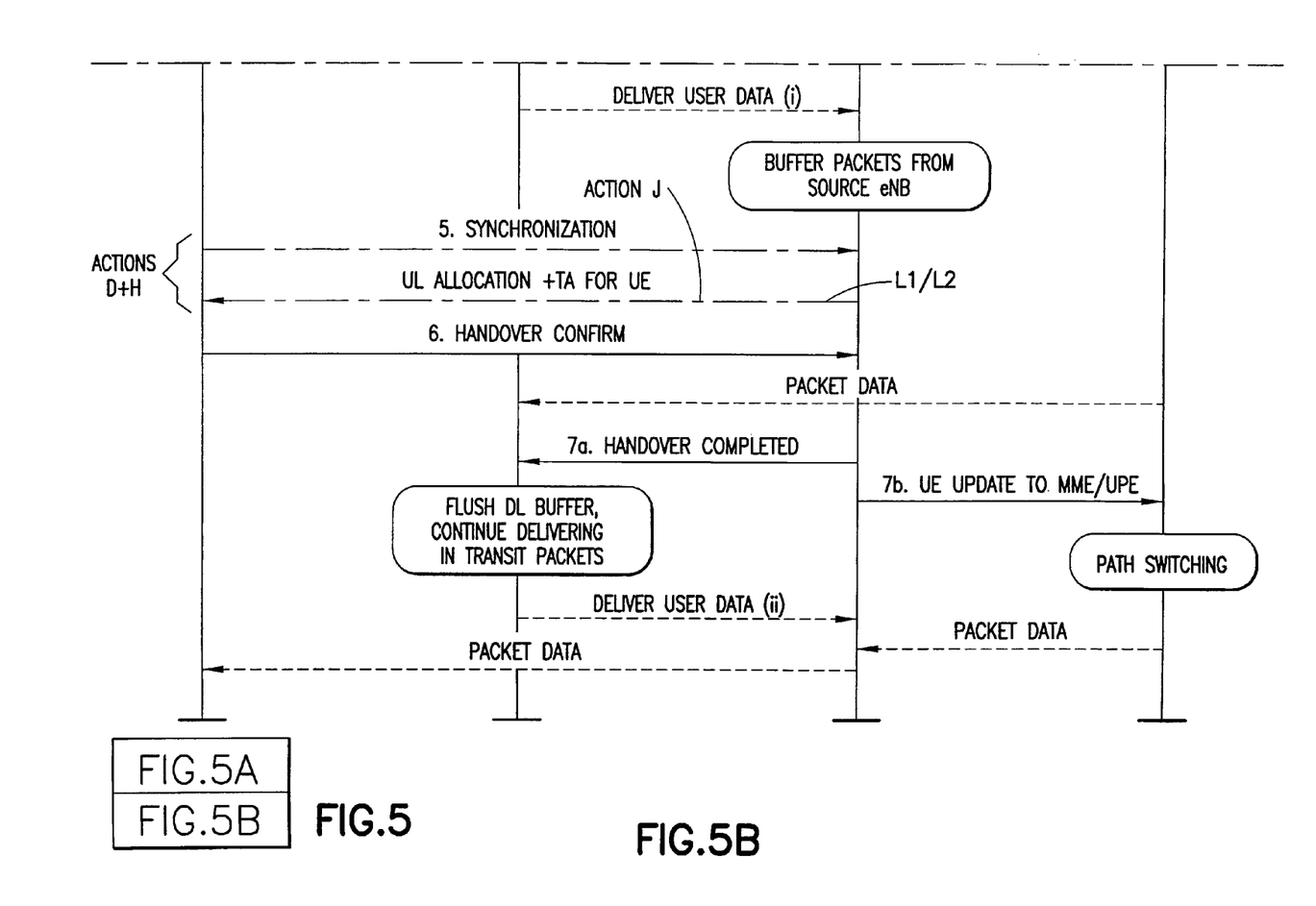
FIG. 5 depicts the signaling exchange of FIG. 2, modified to include an exemplary control message (e.g., RRC HO message) to provide reliable UL synchronization for an exemplary handover control example.
Figure 5A:
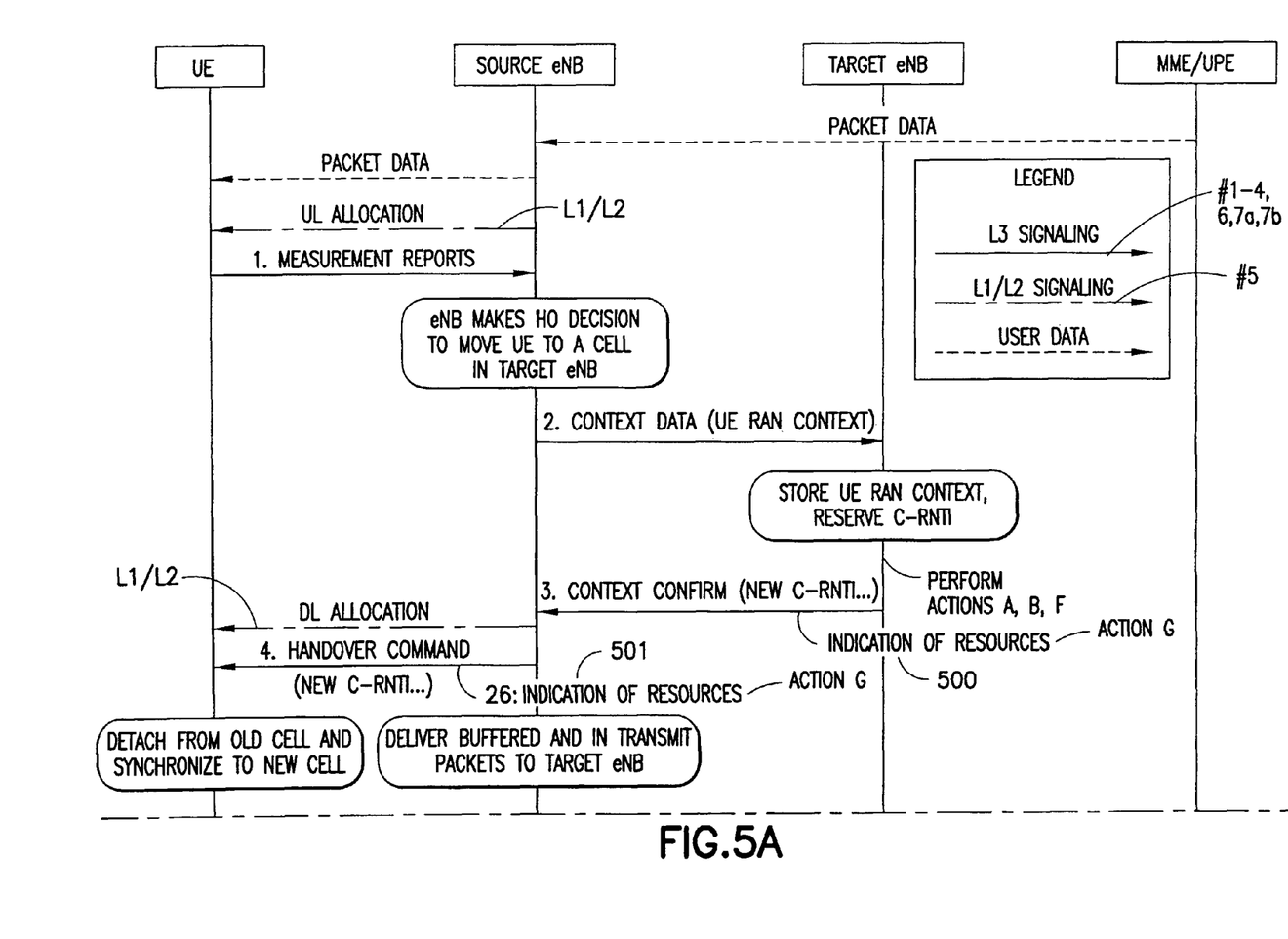

The method shown in FIG. 3 could be applied, for instance, to the example of FIG. 2. This is shown in FIG. 5, where the Target eNode B performs Actions A, B, and F sometime after receiving Action 2 of FIG. 5. In this example, the Target eNode B passes (Action G of FIG. 3) the Source eNode B an indication 500 of resources 30. The Source eNode B performs Action G by communicating a control message 20 (e.g., HO RRC message 26 of FIG. 1) containing an indication 501 of resources 30 to the UE in Action 4 of FIG. 5. The Target eNode B (and the UE) performs Actions D+H of FIG. 3 in Actions 5 and "UL allocation+TA for UE". It is noted that the "UL allocation" in FIG. 5 can also operate in accordance with an exemplary embodiment of the disclosed invention. In this embodiment, the dedicated resources dedicated in Action F of FIG. 3 may be assigned to the UE just for ranging purposes, and when UE is able to determine timing-advance information, new resources in UL can be allocated (Action J of FIG. 3) together with TA information for the UE.

It is noted that the Actions in FIG. 3 may be spread amongst the Source and Target eNode Bs in different ways, too. For example, the Source eNode B could perform Action A of FIG. 3, and communicate an indication of the need to the Target eNode B in Action 2 of FIG. 5. The Target eNode B could perform actions B and F and report (using Action 3 of FIG. 5) an indication 500 of the resources to the Source eNode B (Action G of FIG. 3). The Source eNode uses the HO RRC message 26 (shown as Handover Command in Action 4 of FIG. 5) to communicate the indication 501 of resources 30 to the UE.

Figures 6, 6B:
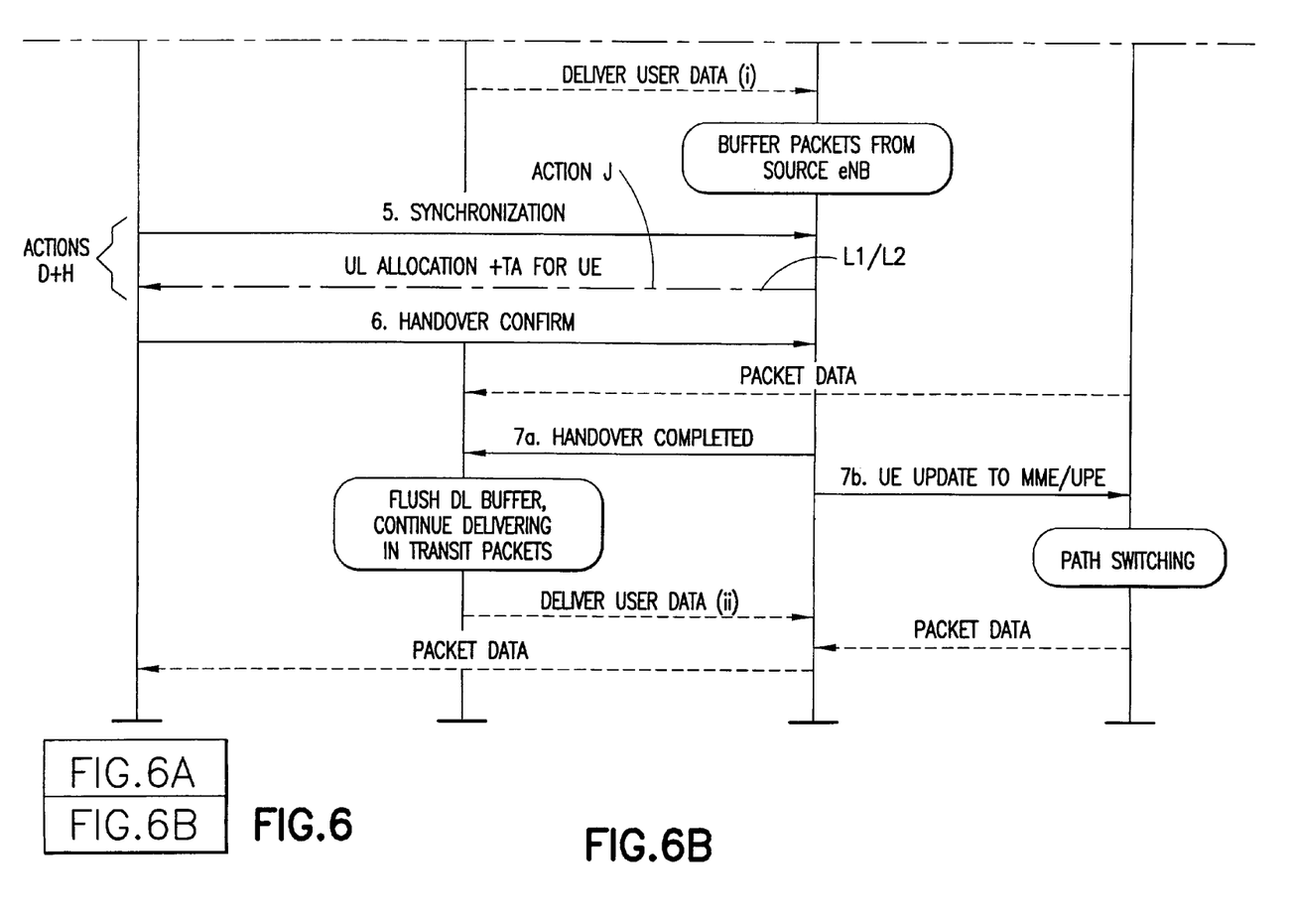
FIG. 6 depicts the signaling exchange of FIG. 2, modified to include an exemplary control message (e.g., L1 AT) to provide reliable UL synchronization for an exemplary handover control example.
Figure 6A:
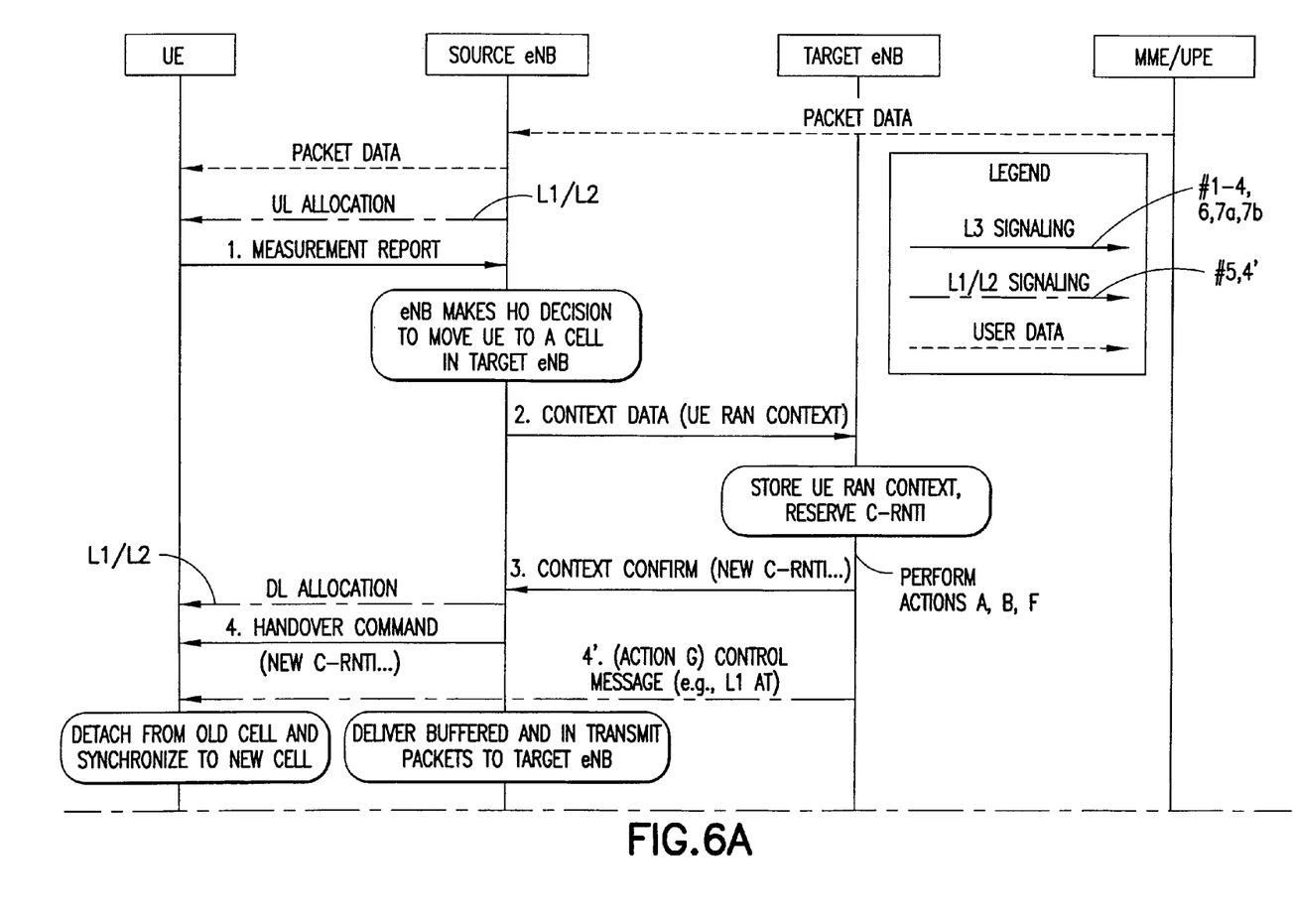

FIG. 6 is another example of applying the method shown in FIG. 3 to the example of FIG. 2. In FIG. 6, the Target eNode B performs Actions A, B, and F sometime after receiving Action 2 in FIG. 6. The Target eNode B also performs Action G by communicating a control message (e.g., control message 20 such as an L1 AT 22 of FIG. 1) to the UE in Action 4' of FIG. 5. The location of Action 4' is merely exemplary. The L1 AT (as shown below in FIG. 4) includes an indication of the resources 30. Optionally, Action J of FIG. 3 may be performed as part of "UL Allocation+Takamoto for UE" in FIG. 6.

Shown in FIG. 4 is a table depicting contents of an exemplary control message 20. In this example, an L1 AT is shown. The L1 AT would be communicated to the UE 10 on a DL logical channel (which is mapped to a DL physical channel). The "UL shared channel allocation" lists $N_{FU}$, the number of frequency resource allocation units, $N_{FCU}$, the number of localized or IFDMA components inside an UL chunk, and $N_{TU}$, the number of temporal resource allocation units with the UL frame. The UL shared channel allocation (and possibly the Timing advance for UL) is an indication of the resources 30 that have been dedicated to the UE. The UE 10 uses this information in order to access the resources 30.

In accordance with the exemplary embodiments of this invention, the resources dedicated by the BS 12 may be on a L1 sub frame basis or some multiple thereof. On the L1, the dedicated resources may resemble an UL RACH transmission, except it is scheduled for the UE 10, rather than contention based. As another non-limiting example the dedicated resources may resemble the RACH channel in terms of the transport format and the reception at the BS 12 (see generally Section 9.1.2.1, Random Access Procedure, of 3GPP TR 25.814). Also, see 3GPP TS 36.213, where the current RACH procedure is specified, in which up-to-date LTE RACH information can be found including format and usage. In terms of details of the RACH, Long Term Evolution (LTE) of UTRAN or E-UTRAN standardization has just started, and consequently E-UTRAN dedicated RACH-related details are somewhat open. The up-to-date information of E-UTRAN RACH can be found in 3GPP TS 36.213. However, details of 3GPP UTRAN RACH-related issues may be found as follows: RACH channels can be found in TS 25.211; L1 random-access and synchronization procedures can be found in TS 25.214. Additionally, examples of synchronization and ranging procedures in OFDMA based broadband wireless area networks can be found in IEEE 802.16: Section 6.3.10 and 8.3.7.1-2.

The use of the exemplary embodiments of this invention provides a more reliable and faster (re)establishment of UL 10 synchronization and radio connection for the UE in need (e.g., an urgent need) for, as a non-limiting example, the E UTRAN system. This is of great importance considering the latency requirements of E UTRAN and the successful chances of handover, as well as call setup and active connection reestablishment. This, in turn, improves the overall QoS and yields an improved end user experience.

Based on the foregoing it should be apparent that the exemplary embodiments of this invention provide a method, apparatus and computer program product(s) to enable a UE to quickly establish (e.g., re-establish) an UL connection by temporarily assigning dedicated UL resources to the UE for use in contacting a BS so as to initiate an UL synchronization procedure.

In general, the various embodiments may be implemented in hardware or special purpose circuits, software, logic or any combination thereof. For example, some aspects may be implemented in hardware, while other aspects may be implemented in software (e.g., firmware) which may be executed by hardware such as a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware (e.g., special purpose circuits or logic, general purpose hardware or controller or other computing devices), software (e.g., firmware, read-only embedded programs), or some combination thereof.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    in response to determining that a user equipment has a need to establish uplink synchronization with a second base station, determining whether dedicated uplink resources are available in a random access channel for the user equipment, wherein the need comprises a handover process from a first base station to which the user equipment is assigned to the second base station to which the user equipment is to be assigned after completion of the handover process; and
    in response to determining that the dedicated uplink resources are available for the user equipment, assigning the dedicated uplink resources on a non-contention-based channel in the random access channel to the user equipment and communicating a radio resource control handover message, comprising an indication of the dedicated uplink resources, from the second base station to the user equipment via the first base station, wherein the second base station communicates directly with the first base station, wherein the steps of determining, dedicating and communicating are performed without first receiving a request from the user equipment for the uplink resources.

2. The method of claim 1, further comprising: using at least the uplink resources, synchronizing with the user equipment on the non-contention-based channel in order to receive information from the user equipment, wherein synchronizing further comprises receiving, by the second base station, timing advance information from the user equipment.

3. The method of claim 1, further comprising: using at least the uplink resources, synchronizing with the user equipment on the non-contention-based channel in order to receive information from the user equipment, wherein communicating an indication of the dedicated uplink resources further comprises communicating a bit sequence to the user equipment and wherein synchronizing further comprises receiving the bit sequence from the user equipment.

4. The method of claim 1, further comprising: using at least the uplink resources, synchronizing with the user equipment on the non-contention-based channel in order to receive information from the user equipment; and, after synchronizing, assigning new dedicated resources to the user equipment for use by the user equipment in further transactions with the second base station.

5. The method of claim 1, wherein the dedicated uplink resources comprise at least one of uplink channel, frequency, time slot, or spreading code for the non-contention-based channel, and wherein the indication corresponds to the at least one of uplink channel, frequency, time slot, or spreading code.

6. The method of claim 1, wherein determining whether the dedicated uplink resources are available for the user equipment further comprises determining if a subscription class associated with the user equipment meets a predetermined subscription class.

7. The method of claim 1, wherein determining whether the dedicated uplink resources are available for the user equipment further comprises determining if a priority associated with the user equipment takes precedence over priorities of other user equipment.

8. The method of claim 1, wherein the handover process entails the user equipment detaching a first connection with the first base station prior to synchronizing with the second base station to establish a second connection.

9. A computer-readable memory tangibly embodying a program of machine-readable instructions executable by at least one data processor of a second base station to perform operations comprising:
    in response to determining that a user equipment has a need to establish uplink synchronization with the second base station, determining whether dedicated uplink resources are available in a random access channel for the user equipment, wherein the need comprises a handover process from a first base station to which the user equipment is assigned to the second base station to which the user equipment is to be assigned after completion of the handover process; and
    in response to determining that the dedicated uplink resources are available for the user equipment, assigning the dedicated uplink resources on a non-contention-based channel in the random access channel to the user equipment and communicating a radio resource control handover message, comprising an indication of the dedicated uplink resources, from the second base station to the user equipment via the first base station, wherein the second base station communicates directly with the first base station, wherein the operations of determining, dedicating and communicating are performed without first receiving a request from the user equipment for the uplink resources.

10. The computer-readable memory of claim 9, the operations further comprising: using at least the uplink resources, synchronizing with the user equipment on the non-contention-based channel in order to receive information from the user equipment, wherein the operation of synchronizing further comprises the operation of receiving timing advance information from the user equipment.

11. The computer-readable memory of claim 9, the operations further comprising: using at least the uplink resources, synchronizing with the user equipment on the non-contention-based channel in order to receive information from the user equipment, wherein the operation of communicating an indication of the dedicated uplink resources further comprises the operation of communicating a bit sequence to the user equipment and wherein synchronizing further comprises receiving the bit sequence from the user equipment.

12. The computer-readable memory of claim 9, the operations further comprising: using at least the uplink resources, synchronizing with the user equipment on the non-contention-based channel in order to receive information from the user equipment; and, after synchronizing, assigning new dedicated resources to the user equipment for use by the user equipment in further transactions with the base station.

13. The computer-readable memory of claim 9, wherein the dedicated uplink resources comprise at least one of uplink channel, frequency, time slot, or spreading code for the non-contention-based channel, and wherein the indication corresponds to the at least one of uplink channel, frequency, time slot, or spreading code.

14. The computer-readable memory of claim 9, wherein the operation of determining whether the dedicated uplink resources are available for the user equipment further comprises the operation of determining if a subscription class associated with the user equipment meets a predetermined subscription class.

15. The computer-readable memory of claim 9, wherein the operation of determining whether the dedicated uplink resources are available for the user equipment further comprises the operation of determining if a priority associated with the user equipment takes precedence over priorities of other user equipment.

16. The computer-readable memory of claim 9, wherein the handover process entails the user equipment detaching a first connection with the first base station prior to synchronizing with the second base station to establish a second connection.

17. An apparatus, comprising:
at least one data processor; and
a memory including program instructions, the memory and the program instructions being configured to, with the at least one data processor, cause the apparatus at least to perform: in response to a determination that a user equipment has a need to establish uplink synchronization with the apparatus, determine whether dedicated uplink resources are available in a random access channel for the user equipment, wherein the apparatus comprises a second base station, wherein the need comprises a handover process from a first base station to which the user equipment is assigned to the second base station to which the user equipment is to be assigned after completion of the handover process, and, in response to the determination that the dedicated uplink resources are available for the user equipment, assign the dedicated uplink resources on a non-contention-based channel in the random access channel to the user equipment and communicate a radio resource control handover message, comprising an indication of the dedicated uplink resources, from the second base station to the user equipment via the first base station, wherein the second base station communicates directly with the first base station, wherein determining, dedicating and communicating are performed by the second base station without first receiving a request from the user equipment for the uplink resources.

18. The apparatus of claim 17, wherein at least the memory and the at least one data processor are formed on an integrated circuit.

19. The apparatus of claim 17, wherein the at least one processor is further configured, using at least the uplink resources, to synchronize on the non-contention-based channel with the user equipment in order to receive information from the user equipment and wherein the at least one data processor is further configured, when synchronizing, to receive timing advance information from the user equipment.

20. The apparatus of claim 17, wherein the at least one processor is further configured, using at least the uplink resources, to synchronize on the non-contention-based channel with the user equipment in order to receive information from the user equipment, wherein the at least one data processor is further configured, when communicating an indication of the dedicated uplink resources, to communicate a bit sequence to the user equipment, and wherein the at least one data processor is further configured, when synchronizing, to receive the bit sequence from the user equipment.

21. The apparatus of claim 17, wherein the at least one processor is further configured, using at least the uplink resources, to synchronize on the non-contention-based channel with the user equipment in order to receive information from the user equipment and wherein the at least one data processor is further configured, after synchronization, to assign new dedicated resources to the user equipment for use by the user equipment in further transactions with the second base station.

22. The apparatus of claim 17, wherein the dedicated uplink resources comprise at least one of uplink channel, frequency, time slot, or spreading code for the non-contention-based channel, and wherein the indication corresponds to the at least one of uplink channel, frequency, time slot, or spreading code.

23. The apparatus of claim 17, wherein the at least one data processor is configured, when performing the determination of whether the dedicated uplink resources are available for the user equipment, to determine if a subscription class associated with the user equipment meets a predetermined subscription class.

24. The apparatus of claim 17, wherein the at least one data processor is configured, when performing the determination of whether the dedicated uplink resources are available for the user equipment, to determine if a priority associated with the user equipment takes precedence over priorities of other user equipment.

25. The apparatus of claim 17, wherein the handover process entails the user equipment detaching a first connection with the first base station prior to synchronizing with the second base station to establish a second connection.

26. An apparatus, comprising:
means, responsive to a determination that a user equipment has a need to establish uplink synchronization with the apparatus, for determining whether dedicated uplink resources are available in a random access channel for the user equipment, where the apparatus comprises a second base station, wherein the need comprises a handover process from a first base station to which the user equipment is assigned to the second base station to which the user equipment is to be assigned after completion of the handover process; and
means, responsive to a determination that the dedicated uplink resources are available for the user equipment, for assigning the dedicated uplink resources on a non-contention-based channel in the random access channel to the user equipment, where the means for assigning is further for communicating a radio resource control handover message, comprising an indication of the dedicated uplink resources, from the second base station to the user equipment via the first base station, wherein the second base station communicates directly with the first base station, wherein the means for determining and the means for assigning operate without the second base station first receiving a request from the user equipment for the uplink resources.

27. The apparatus of claim 26, wherein the handover process entails the user equipment detaching a first connection with the first base station prior to synchronizing with the second base station to establish a second connection.

* * * * *